United States Patent

Morrey

[15] 3,676,768

[45] July 11, 1972

[54] SOURCE INDEPENDENT POWER SUPPLY

[72] Inventor: Walter T. Morrey, Cambridge, Mass.

[73] Assignee: The Bendix Corporation

[22] Filed: Jan. 27, 1971

[21] Appl. No.: 110,200

[52] U.S. Cl..................................323/22 T, 307/17, 321/2, 323/9, 323/20
[51] Int. Cl........................................................G05f 1/58
[58] Field of Search ...............321/2, 18, 21; 323/9, 20, 22 T, 323/DIG. 1; 307/17, 33

[56] References Cited

UNITED STATES PATENTS

| | | |
|---|---|---|
| 3,427,525 | 2/1969 | Thornwall....................................321/2 |
| 3,350,629 | 10/1967 | Kirby................................323/DIG. 1 |
| 3,551,777 | 12/1970 | Bingley........................................321/2 |
| 3,473,039 | 10/1969 | Fegley......................................321/2 X |

Primary Examiner—A. D. Pellinen
Attorney—Lester L. Hallacher and Plante, Hartz, Smith & Thompson

[57] ABSTRACT

A power supply which yields one or more constant output voltages independently of the input voltage level and irrespective of whether the energizing source is AC or DC, and irrespective of the frequency of the source. The input voltage energizes a variable duty cycle generator, the duty cycle of which is controlled by a variable off-time oscillator. The off time of the oscillator is established by a reference voltage and the system output voltage so that the output voltage is regulated irrespective of the input voltage.

9 Claims, 6 Drawing Figures

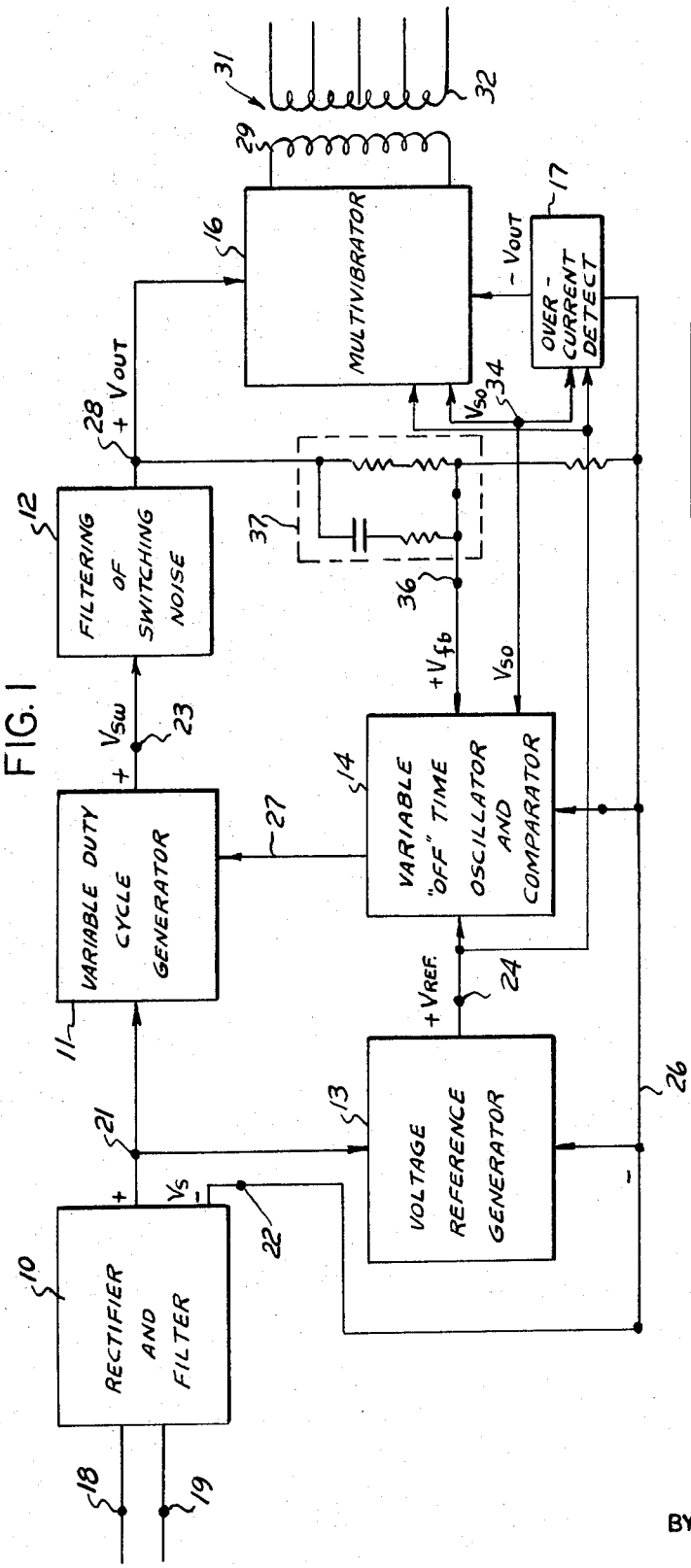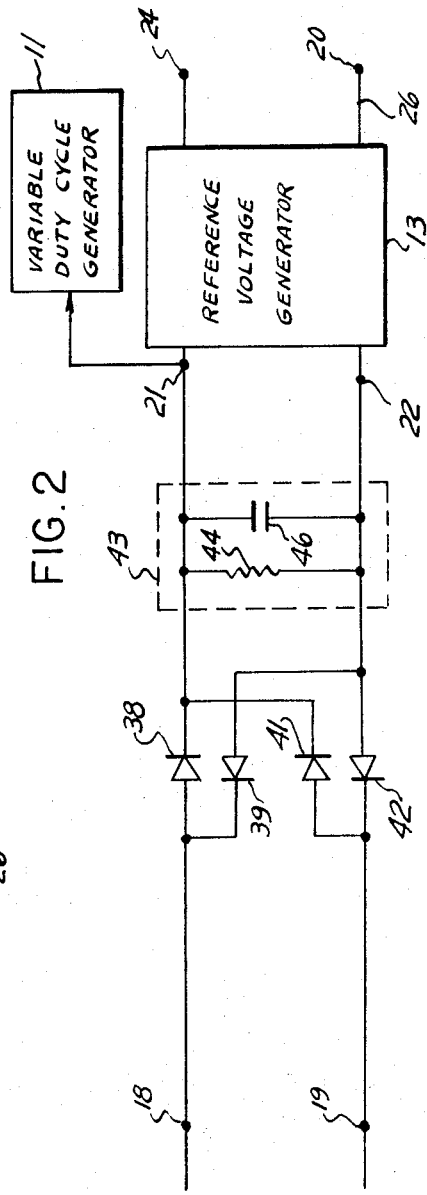
INVENTOR
WALTER T. MORREY

INVENTOR
WALTER T. MORREY
BY
ATTORNEY

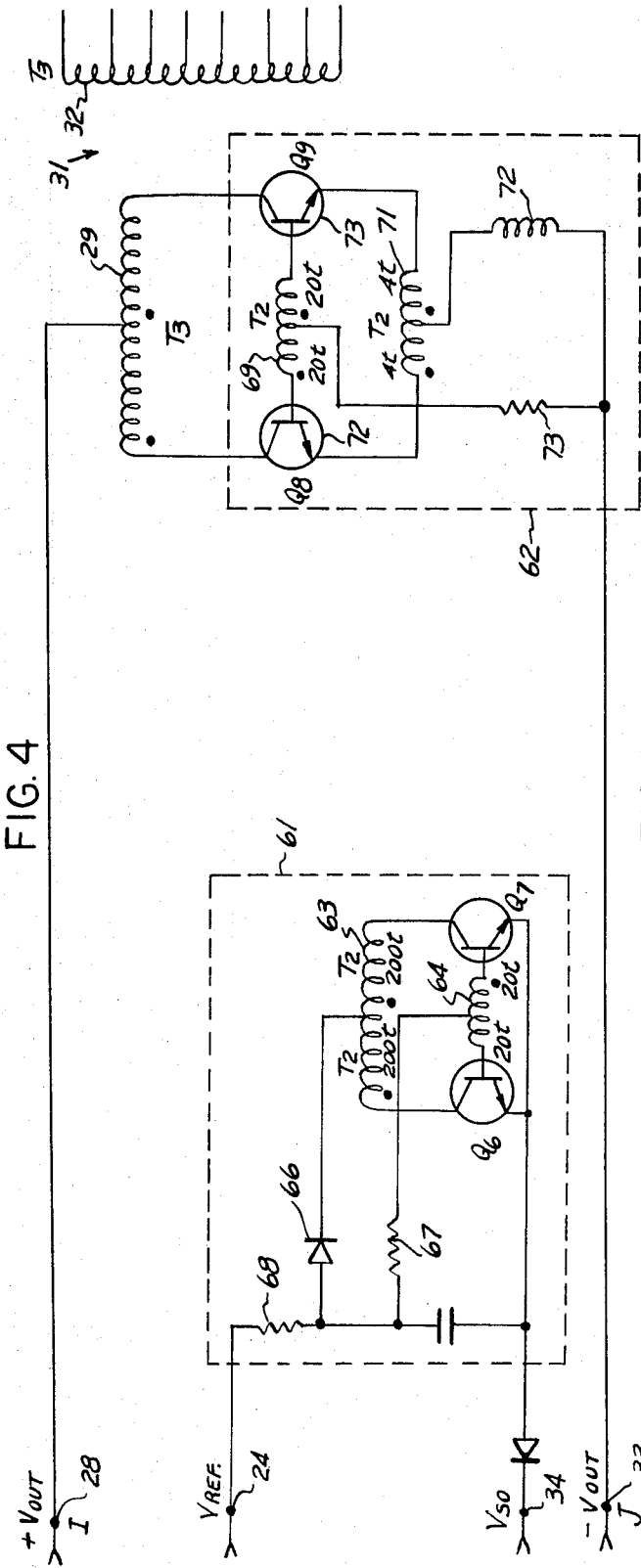
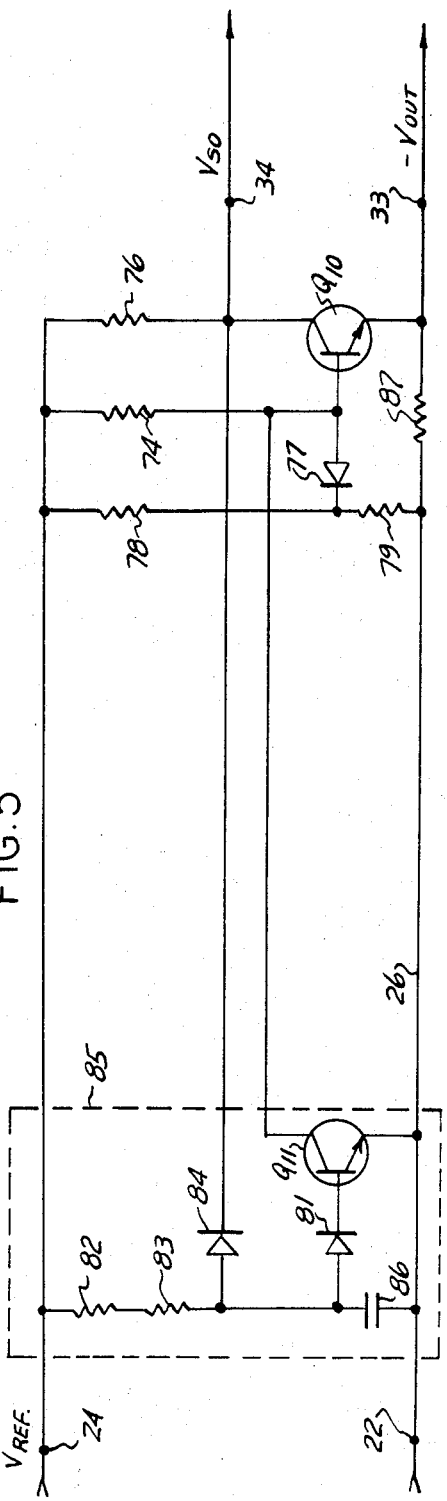
FIG. 4
FIG. 5
INVENTOR
WALTER T. MORREY
BY
ATTORNEY 3,676,768

SOURCE INDEPENDENT POWER SUPPLY

BACKGROUND OF THE INVENTION

Because all electronic equipment requires a power supply, the mobility of various types of equipment is severely limited by the requirement of a particular type of input voltage to the power supply. The limitation usually occurs because the equipment must necessarily operate on either AC or DC current of a particular voltage level. This problem has been recognized in the past and various attempts at solving it have been made. As an example, various types of portable radios can operate on either a DC battery or a 110, 60-cycle supply. However, these two alternatives offer the extent of the flexibility of the power supply. Therefore, if an AC source is available but it is of a voltage or frequency other than the 110 volts and 60 hertz, the system cannot be operated from this source. The same is true of the DC portion of the device in that the required battery voltage as determined by the design of the power supply is the only voltage which will permit proper operation of the device. Accordingly, the mobility of existing electronic equipment is severely limited by the stringent requirements of the energizing source.

Power supplies which are energized by an AC source are also limited by the requirement for a fixed frequency input. This limits foreign use, where the typical frequency is 50 cycles. Consequently, equipment produced for export must have a power supply which is different from that used in domestic equipment.

SUMMARY OF THE INVENTION

The inventive power supply overcomes these disadvantages because it can be used with an energizing source which is AC of a wide voltage range and of differing frequencies, as well as a wide range DC voltage input. During the design of the inventive power supply one or more preselected output voltage levels can be selected, and these outputs are obtained irrespective of the voltage level or frequency of the energizing source and irrespective of whether or not the energizing source is DC. The predesigned output voltages remain constant without the necessity of adjustment of the power supply as the energizing source is changed.

The voltage output from the energizing source which serves as the input to the inventive power supply is first injected into a rectifier and filter, which serves as the input means for the power supply, so that a constant level of DC voltage is obtained from the filter. The output of the rectifier is then directed to a circuit which establishes a reference voltage. The rectifier output is also fed to a variable duty cycle square wave generator.

The output of the reference source, that is the reference voltage, is fed to an on-off circuit means, such as a variable off time oscillator. The variable off time oscillator is used to control a control signal generator means. The control signal generator means can be a variable cycle square wave generator, the duty cycle of which is controlled by the on-off oscillator. The output of the variable duty cycle square wave generator is then directed to a filtering and switching circuit to establish a control output which controls the system output means. The output means can include a multivibrator which actuates a driving circuit. The output of the multivibrator actuates the primary of an output transformer within the driving circuit so that the preselected output voltages are present on the secondary of the transformer. By properly tapping the secondary of the output transformer and, if desired by rectifying the output, constant AC or DC outputs can be obtained irrespective of the nature of the input source.

The output of the filtering and switching circuit is also fed back to the variable off-time oscillator where it is compared with the reference voltage established by the reference voltage circuit to thereby maintain a constant output from the filtering and smoothing circuits.

The inventive power supply also includes overload protection which automatically shuts the circuit off in the event of an overload or short circuit in the output thereof.

BRIEF DESCRIPTION OF THE DRAWINGS

FIG. 1 is a block diagram of a preferred embodiment of the inventive power supply.

FIG. 2 is a schematic diagram showing a rectifier and filter circuit which can be used in the inventive system.

FIG. 4 is a schematic showing of an output multivibrator and a transformer driver which can be used in the inventive system.

FIG. 5 shows a circuit which can be used to detect overcurrent flow in the inventive system.

DETAILED DESCRIPTION

Figure 3:
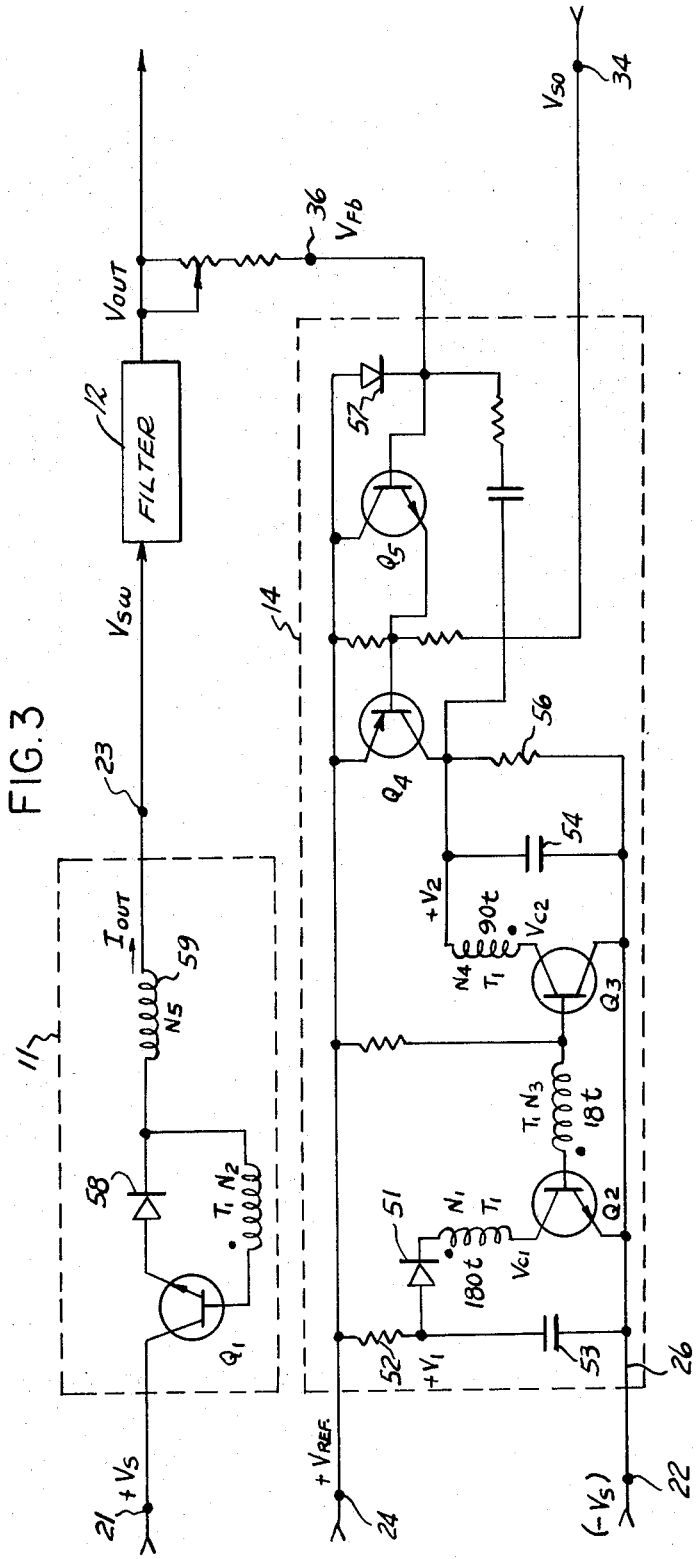
FIG. 3 is a schematic showing of the variable off-time oscillator, a comparative circuit, and a variable duty cycle generator which can be useful with the inventive system.

In FIG. 1, the inventive power supply is energized by connecting Input Terminals 18 and 19 to an energizing source of any type and which is therefore not shown. The energizing source can be an alternating current or a direct current source, the input voltage can be from 28 to 250 volts, and the frequency can be different from the standard 60 hertz frequency used in the United States. The source voltage serves as the input voltage to a Rectifier 10 so that a rectified line voltage $V_s$ is then presented across Output Terminals 21 and 22 of Rectifier 10. Output Terminal 21 is positive with respect to Terminal 22 and Terminal 22 is connected to Lead 26, which serves as a common lead for the power supply system.

The rectified voltage $V_s$ then serves as an input voltage to a Variable Duty Cycle Square Wave Generator 11, the output of which is a variable duty cycle square wave voltage $V_{sw}$ which is present on Terminal 23.

The output voltage $V_s$ of Rectifier 10 also serves as an input to a Voltage Reference Generator 13. The output of Reference Generator 13 is a reference voltage $V_{ref}$, which has a voltage level which is convenient for the system and which is selected at the time the system is designed. Reference Generator 13 can include a Zener diode, the normal operating voltage of which is equal to the reference voltage $V_{ref}$ in combination with one or more transistors to form the reference generator in manners known to those skilled in the art. Reference Generator 13 is also referenced to Common Line 26, as is the rest of the system.

Reference voltage $V_{ref}$ serves as an input to a Variable Off-Time Oscillator 14 which is also coupled to the Variable Duty Cycle Generator 11 as demonstrated by Lead Line 27. Accordingly, output voltage $V_{sw}$ of Duty Cycle Generator 11 is dependent upon the operation of Variable Off-Time Oscillator 14. It should be noted that the Coupling 27 between Oscillator 14 and Generator 11 is actually an inductive coupling as will be more fully described hereinafter with respect to FIG. 3.

The output voltage $V_{sw}$ of Generator 11 is then smoothed to remove extraneous noise in a Filter 12. The output voltage $V_{out}$ of Filter 12 is present on Output Terminal 28.

The output voltage $V_{out}$ of Filter 12 is used to control a Multivibrator 16 which drives the Primary 29 of an Output Transformer 31. The Secondary 32 of Transformer 31 is tapped at various places so that various output voltages are obtainable from the power supply. If DC output voltages are required, the AC voltages present on the secondary can be rectified into the DC voltages required. Obviously, if negative voltages are required, one of the taps can be grounded.

Multivibrator 16 is referenced to Common Line 26 through an Overcurrent Detector 17. Overcurrent Detector 17 produces a shutoff voltage $V_{so}$, which is used to shut off Multivibrator 16 and Variable Off-Time Oscillator 14 in the event that an overcurrent is detected within the power supply or its load. Voltage $V_{so}$ is 0 volts when the circuit is operating normally and rises to the level of reference voltage $V_{ref}$ to cause shutdown of the circuit when an overcurrent is detected. This operation is more fully described hereinafter with respect to FIG. 5.

Variable Off-Time Oscillator 14 also receives a feedback voltage $V_{fb}$. Feedback voltage $V_{fb}$ is received from Terminal 28 so that the voltage is the output voltage $V_{out}$ present on Output Terminal 28 after it has passed through an RC Network 37. When the power supply is in full regulation, $F_{fb}$ is equal to $V_{ref}$. The off time of Oscillator 14 is controlled by the voltages $V_{ref}$ and $V_{fb}$, and the duty cycle of Generator 11 is controlled by the on and off time of Oscillator 14 so that a relatively constant voltage $V_{out}$ is obtained from the power supply.

The operation and nature of the inventive power supply is such that the output voltages present on the taps of Secondary 32 of Transformer 31 are constant irrespective of the nature and voltage level of the input voltage applied across Terminals 18 and 19 of Rectifier 10. For this reason, the power supply can be energized by any available source simply by connecting the Input Terminals 18 and 19 of the power supply to the available source. This can be effected without the necessity of adjusting the power supply or making any selection relative to the mode of operation intended. Furthermore, the outputs available on the Output Transformer 31 of the system can be selected to be AC or DC. DC voltages can be attained simply by rectifying the available AC voltages. Desired voltage levels can be achieved by selecting the locations of the output taps on Secondary 32.

A more detailed description of the operation of the inventive power supply can be obtained by referring to FIGS. 2 through 7 which are individually used as a basis for a description of the operation of the various subcircuits which compose the inventive system. The reference numbers used to identify the various input and output terminals shown in FIG. 1 are similarly identified in the later figures in order to facilitate the correlation of the subcircuits with the block diagram of FIG. 1.

FIG. 2 shows a rectifier and a reference voltage generator which can be used in the inventive power supply. A pair of oppositely poled Diodes 38 and 39 is connected to Input Terminal 18. Diode 38 is poled so that any positive potential available on Input Terminal 18 is presented to Output Terminal 21. Diode 39 is oppositely poled so that any negative voltage present on Input Terminal 18 will be present on Output Terminal 22. A similar pair of oppositely poled Diodes 41 and 42 is connected to Input Terminal 19. Diode 41 is poled so that any positive voltage present on Terminal 19 is presented to Output Terminal 21 while Diode 42 is poled so that any negative potential available on Input Terminal 19 will be presented to Output Terminal 22. The four diodes therefore serve as a full wave rectifier when the input voltage is an AC.

If the input voltage is DC and is poled so that Terminal 18 is positive with respect to Terminal 19, Diode 38 is biased such that Output Terminal 21 is positive. Alternatively, if Input Terminal 19 is positive with respect to Terminal 18, Diode 41 is poled so that Output Terminal 21 is positive with respect to the Output Terminal 22. Accordingly, in either instance, Output Terminal 21 is positive with respect to the Output Terminal 22. Output Terminal 22 is connected to Line 26 which serves as the common line for the entire power supply and accordingly within the power supply can be considered as ground. Accordingly, all voltages referred to herein are referenced with respect to the voltage on Line 26.

When the energizing source is AC, Filtering Network 43, which includes Resistor 44 and Capacitor 46, smoothes the rectified output voltage from Rectifier 10 to remove the ripple therefrom.

Reference Voltage Generator 13 is used to establish the desired reference voltage and can be any of several available in the art. Reference Voltage Generator 13 serves to establish a reference voltage $V_{ref}$ at Output Terminal 24. Because the reference voltage $V_{ref}$ established by Reference Voltage Generator 13 is one of the primary considerations in the desired operation of the circuit, and also because this voltage is independent of the input voltage available across Terminals 18 and 19, the power supply operates properly irrespective of the current form or voltage level of the energizing source. Accordingly, the wide versatility of the inventive power supply can, in part, be accredited to the configuration of Rectifier 10 and also to the independence of reference voltage $V_{ref}$ from the input voltage form and level.

FIG. 3 is a detailed showing of Variable Off-Time Oscillator 14 and Variable Duty Cycle Generator 11 which are shown in FIG. 1. The Variable Off-Time Oscillator 14 includes a Square Loop Transformer $T_1$. Transformer $T_1$ has three primary windings which have turns of $N_1$, $N_3$, and $N_4$. A fourth, and secondary, winding $N_2$ is wound onto Transformer $T_1$ so that Coil $N_2$ and Coil $N_1$ are very tightly coupled. This tight inductive coupling between the two coils is represented in FIG. 1 by Lead 27 which extends from the Variable Off-time Oscillator 14 to Duty Cycle Generator 11.

Oscillator 14 is composed of two Transistors $Q_2$ and $Q_3$, the bases of which are each coupled to one end of Coil $N_3$ and the emitters of which are connected to the Common Line 26.

The operation of Transistor $Q_2$ is controlled by Coil $N_1$ through a Diode 51. The other end of Diode 51 is connected to the junction of a Resistor 52 and Capacitor 53 which are serially connected between the reference voltage $V_{ref}$ of Terminal 24 and Common Line 26. The operation of Transistor $Q_3$ is controlled by Coil $N_4$, one end of which is connected to reference voltage $V_{ref}$ through the collector-emitter junction of another Transistor $Q_4$. An RC network including Capacitor 54 and Resistor 56 is connected across Coil $N_4$ and Transistor $Q_3$ to permit discharge of Coil $N_4$ to Common Lead 26.

The comparator network is formed from Transistors $Q_4$ and $Q_5$ which are connected in the manner shown in FIG. 3. A Diode 57 is connected across the base-collector junction of Transistor $Q_5$. The emitter of Transistor $Q_5$ is referenced to the voltage reference $V_{ref}$ while the other side of Diode 57 is maintained at the feedback potential $V_{fb}$. When the system is regulating $V_{fb} = V_{ref}$, and therefore there is no drop across the diode. Changes in the voltage $V_{fb}$, which can be occasioned by changes in voltage $V_{sw}$, result in a potential across Diode 57 which turns on Transistor $Q_5$. Transistor $Q_5$ then turns on Transistor $Q_4$, resulting in a variation in voltage $V_2$ on Coil $N_4$. This voltage controls the "off" time of Oscillator 14, which controls the duty cycle of Generator 11 in a manner described more fully hereinafter.

The Variable Duty Cycle Generator 11 includes a Transistor $Q_1$, the collector-emitter junction of which is connected in a series with a Diode 58 and a Coil 59. Coil $N_2$ of Transformer $T_1$ is connected from the base of Transistor $Q_1$ to the junction of Diode 58 and Coil 59.

The operation of Variable Off-Time Oscillator 14 and Duty Cycle Generator 11 and the cooperation between these two circuits can best be understood by first understanding the operation of a square loop transformer oscillator. This operation is explained with reference to FIG. 6, which shows a typical and standard type of square loop transformer oscillator. The oscillator includes two Transistors $Q_a$ and $Q_b$ symmetrically connected in the manner shown in FIG. 6. The square loop core transformer obeys the law:

$$V_{Na} t = 10^{-8} N_a \phi$$

where:

$V_{Na}$ is the voltage across a winding having turns $N_a$, $t$ is the time that the transformer core will sustain a voltage $V_{Na}$ before saturation. At saturation the core no longer acts like a transformer, and $\phi$ is a function of the core and is a constant for a given core.

When Transistor $Q_a$ turns on, voltage $V_{ca}$ goes to ground and voltage $V_{cb}$ goes to $V_b + (N_b/N_a) Va$. Transistor $Q_b$ is therefore reverse biased. After the time $t_a = 10^{-8} N_a\phi/Va$, the core saturates and all voltages across the windings go to zero, thereby turning off Transistor $Q_a$. Because of the energy stored in the core, the transformer will fly back somewhat and turn on Transistor $Q_b$. When $Q_b$ turns on, voltage $V_{cb}$ goes to ground and voltage $V_{ca}$ goes to $V_a + (N_a/N_b) V_b$ and Transistor $Q_a$ is reverse biased. After a time $t_b = 10^{-8} N_b\phi/V_b$, the core saturates and the cycle repeats itself. If the output of the oscillator of FIG. 6 were taken from Coil $N_a$ there would be a high output when Transistor $Q_a$ was off. Hence, by varying $V_b$ the conduction time of Transistor $Q_b$ can be varied, thus varying the "off time" of $Q_a$.

Figure 6:
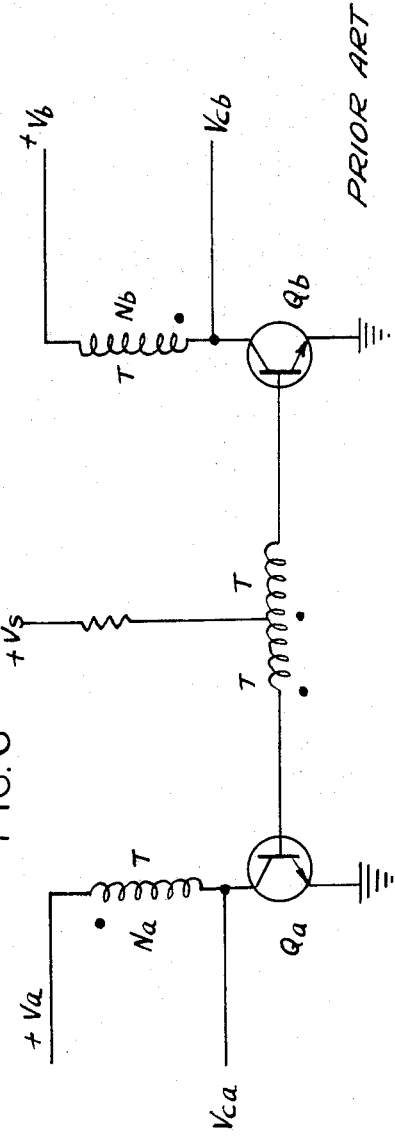
FIG. 6 is a schematic of a prior art square-loop transformer oscillator and is useful in understanding the operation of such oscillators.

Referring again to FIG. 3, Variable Off-Time Oscillator 14 is very similar to the square loop transformer oscillator shown in FIG. 6. However, in FIG. 3 the voltages $V_1$ and $V_2$ which are analogous to voltages $V_a$ and $V_b$ of FIG. 6, are different. Also voltage $V_1$ is kept constant by the reflected load from Winding $N_2$ to Winding $N_1$ so that $V_1 = (V_{58} + V_{BE} Q_1)(N_1/N_2)$. Voltage $V_2$ is varied by the comparator output. Voltage $V_1$ establishes a constant "on" time while Voltage $V_2$ establishes a variable "off" time. The variation of the "off" time varies the output of Variable Duty Cycle Generator 11 to maintain a constant output therefrom. Another difference between the two oscillators of FIGS. 3 and 6 is in the connection of the biasing voltage to one end of the Coil $N_3$, which connects the bases of Transistors $Q_2$ and $Q_3$, while a similar winding used in FIG. 6 is center tapped. This is optional and is done in order to turn $Q_2$ on harder than $Q_3$, and also to reduce costs.

In FIG. 3, when Transistor $Q_2$ is on the voltage $V_1$ is controlled by the reflected load from Variable Duty Cycle Generator 11 and accordingly is controlled by the load on Transistor $Q_1$ and the drop across Diode 58. Accordingly, the voltage at $V_1$ will be approximately equal to
$(N_1/N_2)(V_{bel} + V_{58})$  1
where:

$V_{bel}$ is the voltage across the base-emitter junction of Transistor $Q_1$, and $V_{58}$ is the voltage across Diode 58.

In order to simplify the understanding of the operation, the various coils used in the circuits are assigned exemplary numbers of turns in their windings as follows: $N_1 = 180$ turns; $N_2 = 25$ turns; $N_3 = 18$ turns; $N_4 = 90$ turns, and Coil 59 (i.e., $N_5$) has five turns.

Equation 1 can be rewritten as:

$$V_1 = (180/25)(V_{bel} + V_{58}) \quad 2.$$

The voltage $V_1$ cannot exceed this level, because when the core saturates Capacitor 53 partially discharges. The voltages across the base-emitter junction of Transistor $Q_1$ and Diode 58 will each be approximately 1 volt. Accordingly, Equation 2 can be written as $V_1 \approx (180/25)(1+1) \approx 14$ volts peak.

Coil 58 is in series with Transistor $Q_1$ to provide positive feedback to hold the transistor on. The power to turn Transistor $Q_1$ on comes from Transistor $Q_2$ and Capacitor 53. However, the power to maintain Transistor $Q_1$ in the on condition comes from Coil 59. Because of the Transformer $T_1$ with two volts across Winding $N_1$, there will be a voltage $(5/25)(2) = 0.4$ volts across the 5-turn winding of Coil 59. The output current $I_{out}$ of Coil 59 passes to the base of Transistor $Q_1$ so that there will be a current $(5/25) I_{out} = 0.2 I_{out}$ flowing into the base of Transistor $Q_1$. Thus, the transformer forces the base current $I_B = 0.2 I_E$, $I_E$ being the emitter current. The collector current $I_C$ therefore is:

$$I_C = I_E - I_B = 0.8 I_E$$

and therefore, $I_C = 4 I_B$. Because of the square loop characteristics of Transformer $T_1$, the transformer will maintain this voltage and continue acting like a transformer for a time $t_1 = 10^{-8}(25 \phi/2)$ as determined by the voltage across the Winding $N_2$. At the end of time $t_1$, $Q_1$ and $Q_2$ turn off and $Q_3$ turns on. When $Q_3$ turns on, $Q_1$ and $Q_2$ are reverse biased and the voltage on the core is determined only by the voltage $V_2$ which is present on the input end of Coil $N_4$. Transistor $Q_1$ will remain off for a time $t_2 = 10^{-8}(N_4/V_2 \phi)$. Consequently, the "on" time $t_1$ for Transistor $Q_1$ and the "off" time $t_2$ on Transistor $Q_1$ are as follows:

$$t_1 = 10^{-8}(N_2) \phi/2$$

$$t_2 = 10^{-8}(N_4) \phi/V_2$$

but $N_2 = 25$ (in the example used) and $N_4 = 90$ (in the example used), and therefore:

$$t_1 = 10^{-8}(25 \phi/2) \text{ and}$$

$$t_2 = 10^{-8}(90 \phi/V_2)$$

However, $t_1$ is a constant so that $t_2$ can be described as a variable "off" time in terms of $V_2$ and $t_1$ as follows:

$$t_2 = t_1 (180/25)(V_2^{-1})$$

The average value of the voltage output $V_{sw}$ from Generator 11 is then determined by the expression:

$$\overline{V_{sw}} = V_s \left(\frac{t_1}{t_1 + t_2}\right)$$

$$\overline{V_{sw}} = V_s \left(\frac{t_1}{t_1 + t_1(180/25)(V_2^{-1})}\right)$$

$$\overline{V_{sw}} = V_s \left(\frac{25V_2}{25V_2 + 180}\right)$$

The average output voltage of Generator 11 is therefore dependent upon the "on" time $t_1$ and "off" time $t_2$ of Variable Off-Time Oscillator 14. These times in turn are dependent upon the reference voltage $V_{ref}$ and the output voltage $V_s$ of Rectifier 10. These voltages are independent of the input line voltage to Rectifier 10 and therefore the average value of $V_{sw}$ is the same irrespective of the input voltage.

FIG. 4 is a detailed illustration of Output Multivibrator 61 and Transformer Driving Circuit 62 which are shown collectively in FIG. 1 as Block 16. Output Multivibrator 61 includes a pair of matched Transistors $Q_6$ and $Q_7$ which are inductively coupled through Coils 63 and 64 of Transformer $T_2$ in the manner shown in FIG. 4. The center taps of Transformer Coils 63 and 64 are coupled through the series connection of Diode 66 and Resistor 67, the junction of which is connected to Output Terminal 24 through Resistor 68. This circuit operates in known manner to produce a square wave output which is inductively coupled to Transformer Driver Circuit 62 by the inductive coupling of Coils 63 and 64 to Coils 69 and 71 within the Driver Circuit 62. Transformer Driver Circuit 62 includes a pair of matched Transistors $Q_8$ and $Q_9$, the bases of which are connected by way of Coil 69 of Transformer $T_2$. The emitters of Transistors $Q_8$ and $Q_9$ are connected by way of Winding 71, which also forms a part of Transformer $T_2$. The collectors of Transistors $Q_8$ and $Q_9$ are connected by way of Primary 29 of Transformer $T_3$ which is Output Transformer 31 of the inventive power supply also shown in FIG. 1. Because of this connection of Transistors $Q_8$ and $Q_9$ the switching action of Transistors $Q_6$ and $Q_7$ of Output Multivibrator 61 is reflected to Transistors $Q_8$ and $Q_9$, so that a varying voltage is produced across Primary 29. This voltage is inductively coupled to Secondary 32 to produce the output voltages. The desired voltage levels are obtained by tapping Secondary 32 at the proper locations. If DC output voltages are required, the varying outputs will be rectified in known manner. Also, if negative voltages are required, they can be obtained by grounding one of the taps on the secondary, in known manner.

Coils 69 and 71 of Transformer $T_2$ are center tapped, and these center taps are connected by way of Resistor 73 and Inductor 72. The junction of these two elements is connected to Output Terminal 33 of Overload Detector 17 shown in FIG. 1. Coil 72 helps provide overload protection because it stores energy during normal operation of Driver Circuit 62. However, when a current change occurs because of an overload or short within the power supply or its load, the change is reflected to Coil 72 by way of Output Terminal 33. The change of current causes a rapid discharge of the energy stored in Coil 72, thereby rapidly charging Coil 71 and rapidly shutting off Transistors $Q_8$ and $Q_9$.

The Overload Current Detector Circuit 17 of FIG. 1 is shown in detail in FIG. 5. This circuit includes a Transistor $Q_{10}$, the base and collector of which are respectively connected through identical Resistors 74 and 76 to the Terminal 24 which is at the potential $V_{ref}$. A series connection of two Resistors 78 and 79 is connected between the line at the $V_{ref}$ potential and Common Line 26 and the base of Transistor $Q_{10}$ is connected to the junction of these Resistors 78 and 79 through Diode 77. The junction formed by the connection of Resistor 76 and the collector of Transistor $Q_{10}$ is connected to the Output Terminal 34, from which the shutoff voltage $V_{so}$ is directed to the power supply.

The Overcurrent Latch Circuit 85 includes a Transistor $Q_{11}$, the collector of which is connected to the base of Transistor $Q_{10}$. The base of Transistor $Q_{11}$ is connected through Diode 81 and appropriate biasing Resistors 82 and 83 to the $V_{ref}$ potential. The base of $Q_{11}$ is also connected to Output Terminal 34 by way of back-to-back Diodes 81 and 84.

When the inventive power supply is in its normal operating mode, Resistors 74 and 76 apply current to the base and collector of Transistor $Q_{10}$, and this transistor is normally held on, and Transistor $Q_{11}$ is shut off. For this reason, the output potential present on Output Terminal 34 is equal to 0 volts. When an overcurrent is detected, the voltage at the junction of Resistors 78 and 79 is sufficient to forward bias Diode 77, thereby turning Transistor $Q_{10}$ off. With Transistor $Q_{10}$ off, Transistor $Q_{11}$ turns on, after a slight delay caused by Capacitor 86 and Resistors 82 and 83. When Transistor $Q_{11}$ turns on the potential of Output Terminal 34 rises to a positive level which is approximately equal to the reference voltage $V_{ref}$. Resistor 87 determines the value of current which flows from Terminal 33 to Terminal 22.

OPERATION

The system is energized by applying an available source to Input Terminals 18 and 19. Rectifier 10 then produces an output voltage which, because of the Diode Pairs 38–39 and 41–42, places Output Terminal 21, shown in FIG. 2, at a positive potential $V_s$.

Potential $V_s$ is then applied to Variable Duty Cycle Generator 11 and Reference Voltage Generator 11. Reference Generator 11 supplies a constant voltage $V_{ref}$ which serves as a reference voltage. The application of Voltage $V_s$ from Rectifier 10 causes Variable Duty Cycle Generator 11 to produce an output $V_{sw}$ when Generator 11 is turned on.

Duty Cycle Generator 11 is turned on by Variable Off-Time Oscillator 14, as shown in FIG. 3. When Transistor $Q_2$ is conducting Coil $N_1$ is energized so that Coil $N_2$ of Generator 11 is energized because of inductive coupling so that Transistor $Q_1$ is conductive and $V_{sw}$ is produced at Output Terminal 23. The "on" time of Transistor $Q_2$ is a constant. However, $Q_2$ is turned off when Transistor $Q_3$ is turned on. This occurs when an output is produced from a comparison circuit formed by Transistors $Q_4$ and $Q_5$. This circuit compares a signal which is proportional to voltage $V_{sw}$ with the reference voltage $V_{ref}$ and controls the "off" time of Variable Off Time Oscillator 14 in accordance with the difference. Voltage $V_{sw}$ is therefore maintained at a constant level by the reference voltage $V_{ref}$.

After filtering in Filter 12 (FIG. 1), $V_{sw}$ is used as a constant control voltage $V_{out}$ to control a Transformer Driver Circuit 62 (FIG. 4) which contains a Transformer 31. Because the input voltage $V_{out}$ to Driver Circuit 62 is constant, the output voltages present on Secondary 32 of Transformer 31 are also constant. Reference voltage $V_{ref}$ drives Output Multivibrator 61 which establishes the output frequency of Driver 62 through the inductive coupling of Coils 63 and 64 with Coils 69 and 71.

An Overcurrent Detector (FIG. 5) is current sensitive so that current increases caused by overloads in the system load or failures within the power supply cause the production of a Shut Off Voltage $V_{so}$ on Output Terminal 34. This voltage is applied to Output Multiplier 61 and Variable Off-Time Oscillator 14 to shut down the power supply.

What is claimed is:

1. A power supply for producing at least one regulated output voltage irrespective of the form and level of the source voltage energizing said power supply comprising:

input means receiving said source voltage and producing a line voltage;
 reference signal generator means for producing a reference signal in response to said line voltage;
 variable off-time oscillator means receiving said reference signal, said oscillator including means for varying said off time;
 variable duty cycle control signal generator means receiving said line voltage and responsive to said oscillator to generate a control signal, the off-on condition of said oscillator controlling the duty cycle of said control signal generator;
 means for receiving said control signal and producing a feedback signal;
 said means for varying receiving said feedback signal and said reference signal to thereby control the on-off condition of said oscillator and thereby control said control signal generator to maintain said control signal constant;
 and output means responsive to said control signal for producing said at least one output voltage.

2. The system of claim 1 wherein said variable duty cycle generator is conductive when said oscillator is on and nonconductive when said oscillator is off.

3. The system of claim 2 wherein said variable duty cycle generator includes electron control means responsive to said line voltage; voltage storage means for rendering said electron control means conductive and nonconductive in response to the on-off condition of said oscillator.

4. The system of claim 3 wherein said voltage storage means is an inductor; and wherein said on-off circuit means includes a coil, said inductor and said coil being inductively coupled.

5. The system of claim 4 wherein said electron control means is a transistor having the collector-emitter junction in series with said line voltage, a diode and a winding; and said inductor is connected from the base of said transistor to the junction of said diode and said winding.

6. The system of claim 2 wherein said output means includes an inductive driving circuit for driving an output transformer in response to said control signal; and alternating signal producing means for actuating said driving circuit to produce an alternating output.

7. The system of claim 6 wherein said alternating signal producing means is an inductive multivibrator inductively coupled to said inductive driving circuit.

8. A power supply for producing at least one regulated output voltage irrespective of the form and level of the source voltage energizing said power supply comprising:

input means receiving said source voltage and producing a line voltage;
 reference signal generator means for producing a reference signal in response to said line voltage;
 on-off circuit means receiving said reference signal, said on-off circuit means having a constant on time and a variable off time and including means for varying said off time, said on-off circuit means also including a square loop core transformer and a first coil having $N_1$ turns, a second coil having $N_4$ turns, and said first coil is energized when said on-off circuit is on; and said control signal generator means includes a third coil inductively coupled to said first coil and having $N_2$ turns;
 control signal generator means receiving said line voltage and responsive to said on-off circuit to generate a control signal;
 means for receiving said control signal and producing a feedback signal;
 said means for varying receiving said feedback signal and said reference signal to thereby control the on-off condition of said on-off circuit and thereby control said control signal generator to maintain said control signal constant;
 and output means responsive to said control signal for producing said at least one output voltage.

9. The system of claim 8 wherein said on time ($t_1$) is constant and is defined as:

$$t_1 = 10^{-8} (N_2) \phi/2$$

and said off time ($t_2$) is variable and is defined as:

$$t_2 = 10^{-8} (N_4) \phi/V_2$$

where:
 $\phi$ = a constant for said square loop core
 $V_2$ = the voltage on said second coil.

* * * * *